US012759889B2

(12) United States Patent
Chen et al.

(10) Patent No.: US 12,759,889 B2
(45) Date of Patent: Oct. 13, 2026

(54) ZSM-23 ZEOLITE AND PREPARATION PROCESS AND USE THEREOF

(71) Applicants: CHINA PETROLEUM & CHEMICAL CORPORATION, Beijing (CN); SINOPEC DALIAN RESEARCH INSTITUTE OF PETROLEUM AND PETROCHEMICALS CO., LTD., Dalian (CN)

(72) Inventors: Yujing Chen, Dalian (CN); Hongfei Fan, Dalian (CN); Zhengmin Yu, Dalian (CN); Xiaoyan Sun, Dalian (CN)

(73) Assignees: CHINA PETROLEUM & CHEMICAL CORPORATION, Beijing (CN); SINOPEC DALIAN RESEARCH INSTITUTE OF PETROLEUM AND PETROCHEMICALS CO., LTD., Liaoning (CN)

( * ) Notice: Subject to any disclaimer, the term of this patent is extended or adjusted under 35 U.S.C. 154(b) by 600 days.

(21) Appl. No.: 18/260,668

(22) PCT Filed: Jan. 7, 2022

(86) PCT No.: PCT/CN2022/070678
§ 371 (c)(1),
(2) Date: Jul. 7, 2023

(87) PCT Pub. No.: WO2022/148424
PCT Pub. Date: Jul. 14, 2022

(65) Prior Publication Data

US 2024/0059573 A1 Feb. 22, 2024

(30) Foreign Application Priority Data

Jan. 7, 2021 (CN) ........................ 202110018638.8

(51) Int. Cl.
*C01B 39/46* (2006.01)

(52) U.S. Cl.
CPC .......... *C01B 39/46* (2013.01); *C01P 2002/72* (2013.01); *C01P 2006/12* (2013.01); *C01P 2006/14* (2013.01); *C01P 2006/16* (2013.01)

(58) Field of Classification Search
CPC .... B01J 35/615; B01J 35/643; B01J 2235/15; B01J 2235/30; B01J 35/647; B01J 37/10;
(Continued)

(56) References Cited

U.S. PATENT DOCUMENTS 4,076,842 A 2/1978 Plank et al.
4,490,342 A 12/1984 Valyocsik
(Continued)

FOREIGN PATENT DOCUMENTS

CN 85107676 A 6/1986
CN 1055961 C * 8/2000
(Continued)

OTHER PUBLICATIONS

Chen, Y. et al., Microporous and Mesoporous Materials, 2018, 268, pp. 216-224. (Year: 2018).*
(Continued)

*Primary Examiner* — Christina A Johnson
*Assistant Examiner* — Mordecai M Leavitt
(74) *Attorney, Agent, or Firm* — NKL Law; Allen Xue

(57) ABSTRACT

A ZSM-23 zeolite and a preparation process thereof are provided. The pore volume of mesopores having a pore size of 3-8 nm of the zeolite is 45-90% of the total pore volume of the zeolite. The zeolite has a relative crystallinity of 95-120% and a relative crystallinity retention of 95-100% after a hydrothermal treatment with steam for 2 hours at 600° C. The process for preparing the zeolite includes the following steps: (1) preparing or selecting a silicon source
(Continued)

for preparing the ZSM-23 zeolite, such as amorphous silica; (2) performing an alkali treatment on the silicon source for preparing the ZSM-23 zeolite such as amorphous silica mentioned in step (1); and (3) preparing the ZSM-23 zeolite by using the alkali-treated amorphous silica as the silicon source. The ZSM-23 zeolite has a rich mesoporous structure and a good hydrothermal stability.

21 Claims, 1 Drawing Sheet

(58) Field of Classification Search
CPC .. B01J 21/12; B01J 2229/186; B01J 2229/42; B01J 2235/00; B01J 29/041; B01J 29/48; B01J 29/7461; B01J 29/40; B01J 29/7484; B01J 35/633; B01J 35/635; B01J 35/651; B01J 35/70; B01J 37/0018; B01J 37/0045; B01J 20/18; B01J 20/28019; B01J 20/28057; B01J 20/2808; B01J 20/28083; B01J 20/28085; B01J 21/08; B01J 2229/40; B01J 29/7046; B01J 29/7096; B01J 29/7292; B01J 29/7892; B01J 35/45; B01J 35/50; B01J 35/613; B01J 35/617; B01J 35/638; B01J 35/69; B01J 35/40; B01J 35/695; B01J 35/77; B01J 37/031; B01J 37/033; B01J 37/036; B01J 6/001; C01B 37/02; C01B 39/46; C01B 39/00; C01B 39/04; C10G 45/64
See application file for complete search history.

(56) References Cited

U.S. PATENT DOCUMENTS

| | | | |
|---|---|---|---|
| 4,629,588 | A | 12/1986 | Welsh et al. |
| 5,405,596 | A | 4/1995 | Moini et al. |
| 5,707,601 | A | 1/1998 | Nakagawa |
| 7,157,075 | B1 | 1/2007 | Burton, Jr. et al. |
| 2010/0098623 | A1 | 4/2010 | Gagea et al. |

FOREIGN PATENT DOCUMENTS

| | | | |
|---|---|---|---|
| CN | 1332114 | A | 1/2002 |
| CN | 103818912 | A | 5/2014 |
| CN | 104129800 | A | 11/2014 |
| CN | 105540607 | A | 5/2016 |
| CN | 106513035 | A | 3/2017 |
| CN | 107235497 | A | 10/2017 |
| CN | 107303497 | A | 10/2017 |
| CN | 109569697 | A | 4/2019 |
| JP | S61138508 | A | 12/1986 |
| JP | H01122919 | A | 5/1989 |
| RU | 2148015 | C1 | 4/2000 |
| RU | 2501735 | C2 | 12/2013 |
| WO | 2019203146 | A1 | 10/2019 |

OTHER PUBLICATIONS

Piryutko, L. V., et al. Russian Journal of Applied Chemistry, 2019, 92 (12), pp. 1664-1673 (Year: 2019).*
Silva, B. J. B. et al., Microporous and Mesoporous Materials, 2019, 290, 109647. (Year: 2019).*
Chen, Y. et al. Microporous and Mesoporous Materials, 2017, 252, 146-153. (Year: 2017).*
Ulyanova N. Y., "Synthesis, study of catalytic and biological activity of zeolites with Rho, Beta and paulingite structures modified with silver nanoparticles and clusters", Dissertation for the degree of Candidate of Chemical Sciences, St. Petersburg, 2016, p. 20 paragraph 3, p. 22 paragraph 1.
Schlenker, J. D. et al."The framework topology of ZSM-23 A high silica zeolite"; Zeolites; vol. 5, No. 6; Year: 1985; pp. 352-354.
Panek, R. et al., "Fly ash-derived MCM-41 as a low-cost silica support for polyethyleneimine in post-combustion CO2 capture", Journal of CO2 Utilization, Dec. 1, 2017, vol. 22, pp. 81-90.
Tontisirin, Supak et al., "Hybrid Nanotube Assembly and Hierarchical ZSM-23 Zeolite Synthesized with Cationic Polymer and Enhanced Performance in n-Heptane Hydroisomerization", Chemnomat, Aug. 5, 2020, vol. 06, No. 09, pp. 1398-1406.
Kerstens, Dorien et al., "State of the Art and Perspectives of Hierarchical Zeolites: Practical Overview of Synthesis Methods and Use in Catalysis", Advanced Materials, Sep. 23, 2020, vol. 32, No. 44, pp. 1-47.

* cited by examiner

ZSM-23 ZEOLITE AND PREPARATION PROCESS AND USE THEREOF

TECHNICAL FIELD

The present invention relates to a ZSM-23 zeolite and a preparation process and use thereof, specifically to a mesopore-rich ZSM-23 zeolite and a preparation process and use thereof.

BACKGROUND TECHNOLOGY

ZSM-23 zeolite is a zeolite material with high $SiO_2/Al_2O_3$ ratio and MTT topology structure, and its one-dimensional tear-drop-shaped porous channels are constituted with 10-member rings. With its unique porous channel structure and adjustable acid properties, ZSM-23 zeolite is widely used in the fields of separation, adsorption, and catalysis, playing an irreplaceable role. Especially in the petrochemical industry, it has shown outstanding performance in the hydrocracking of long-chain alkanes and olefins, the isomerization of alkanes and aromatic hydrocarbons, and the like. However, ZSM-23 is a microporous zeolite, which is limited in its ability to handle the conversion of larger molecules due to the porous channel size limitations. Therefore, in order to further expand its application range, it is of great significance to prepare high-performance mesopore-rich ZSM-23 zeolites.

There are currently few publicly available patents that introduce mesoporous structures into microporous ZSM-23 zeolites.

CN106513035 discloses a preparation method for composite zeolite with the ZSM-23 zeolite as the core and MCM-41 or SBA-15 as the shell. According to this method, the mesopores are provided by mesoporous zeolites MCM-41 or SBA-15. Due to its inherent stability and limited range of silica-alumina ratio, the prepared composite zeolite also has disadvantages such as poor stability and narrow adjustable silica-alumina ratio range.

CN105540607 discloses a preparation method for multistage pore channel composite zeolite ZSM-22/ZSM-23, but both ZSM-22 and ZSM-23 zeolites have microporous structures, so the mesoporous structures involved are mainly stacked pores, with poor regularity and stability. According to CN107235497, starch is added to regulate the synthesis path of ZSM-23 zeolite, and calcined at a later stage to be removed, so as to obtain a ZSM-23 zeolite having a mesoporous-microporous hierarchical composite structure. This method has a simple process and low cost, but due to its mesoporous structure obtained by removing the pore expanding agent, it will affect thermal stability and hydrothermal stability.

Common methods for preparing micropore-mesopore composite zeolites include alkali or acid post-treatment, hard template method, surfactant method, etc, and the detailed processing processes have been reported multiple times in articles or patents. However, these methods may lead to the destruction of the microporous structure of the zeolite, resulting in poor stability of the products produced, or the process being too complex and costly, with worrying application prospects. Therefore, developing a ZSM-23 zeolite rich in mesoporous structure with simple process, low cost, and excellent product performance is a technical problem that needs to be solved by those skilled in the art.

SUMMARY OF THE INVENTION

In order to overcome the shortcomings in the existing technology, the present invention provides a ZSM-23 zeolite and a preparation process thereof, and zeolite has a rich mesoporous structure and good hydrothermal stability.

The present invention provides a ZSM-23 zeolite, wherein the pore volume of mesopores having a pore size of 3-8 nm, preferably 3-6 nm of the zeolite is 45-90%, preferably 50-85%, further preferably 55-81% of the total pore volume of the zeolite; the zeolite has a relative crystallinity of 95-120%, and the zeolite has a relative crystallinity retention of 95-100% after a hydrothermal treatment with steam for 2 hours at 600° C.

According to the above-mentioned zeolite, the zeolite has a specific surface area of 300-430 $m^2/g$, and a pore volume of 0.31-0.5 $cm^3/g$, the specific surface area of micropores is 50-170 $m^2/g$, and the specific surface area of mesopores is 150-310 $m^2/g$; Preferably, the specific surface area is 320-405 $m^2/g$, the pore volume is 0.34-0.45 $cm^3/g$, the specific surface area of micropores is 80-140 $m^2/g$, and the specific surface area of mesopores is 261-295 $m^2/g$.

The present invention also provides a process for preparing the ZSM-23 zeolite, wherein the process comprises the following steps:

(1) preparing or selecting a silicon source for preparing the ZSM-23 zeolite, such as amorphous silica;

(2) performing an alkali treatment on the silicon source for preparing the ZSM-23 zeolite mentioned in step (1);

(3) preparing the ZSM-23 zeolite by using the alkali-treated amorphous silica as the silicon source. In step (1) of the above-mentioned process, the silicon source used for preparing the ZSM-23 zeolite can be amorphous silica, as well as other silicon sources that are known in the art, such as one or more of fumed silica, silica sol, and water glass.

In step (1) of the above-mentioned process, said amorphous silica has a specific surface area of 600-1300 $m^2/g$, preferably 700-1200 $m^2/g$; a pore volume of 0.6-1.3 $cm^3/g$, preferably 0.7-1.2 $cm^3/g$; and a pore diameter of 1-15 nm, preferably 2-10 nm.

In step (1) of the above-mentioned process, the preparation process of the amorphous silica is as follows: adding a silicon source to deionized water to be uniformly dispersed, and then adding a surfactant and stirring; adjusting the pH of the resulting solution to 1-5, preferably 1.5-4, and then heating it in a water bath for a period of time; filtering, washing, drying, and calcining to produce the amorphous silica.

According to the above-mentioned process, in the preparation of said amorphous silica, the silicon source is an inorganic silicon source, preferably one or more of water glass, silica sol, or white carbon black.

According to the above-mentioned process, in the preparation of said amorphous silica, the surfactant is one or more of hexadecyltrimethylammonium chloride, hexadecyltrimethylammonium bromide, octodecyltrimethylammonium chloride, octodecyltrimethylammonium bromide.

According to the above-mentioned process, in the preparation of said amorphous silica, the molar ratio of said silicon source as $SiO_2$ to the surfactant is 1:(0.02-0.3), preferably 1:(0.05-0.2).

According to the above-mentioned process, in the preparation of said amorphous silica, the molar ratio of said silicon source as $SiO_2$ to the deionized water is 1:(30-300), preferably 1:(50-220).

According to the above-mentioned process, in the preparation of said amorphous silica, the temperature for heating is 30-80° C., preferably 40-70° C., and the time for heating is 0.5-8 hours, preferably 3-6 hours.

In step (2) of the above-mentioned process, the alkali treatment involves adding the amorphous silica prepared in step (1) to an alkaline solution, heating and stirring.

According to the above-mentioned process, the alkali treatment is performed by using an inorganic alkali, and the inorganic alkali is one or more of sodium hydroxide, potassium hydroxide, or ammonia water.

According to the above-mentioned process, in said alkali treatment, the time for heating and stirring is 0.5-12 hours, preferably 2-8 hours; and the temperature for heating is 25-60° C., preferably 30-50° C.

According to the above-mentioned process, the molar ratio of the inorganic alkali as $OH^-$ to the amorphous silica as $SiO_2$ is 0.05-0.24, preferably 0.06-0.22. The mole number of the inorganic alkali as $OH^-$ can be obtained by conventional analytical chemistry means, the details of which will not be repeated herein.

In step (3) of the above-mentioned process, in the preparation of the ZSM-23 zeolite by using an alkali-treated amorphous silica as the silicon source, any known method for preparing the ZSM-23 zeolite in the existing technology can be used, or a method for preparing the ZSM-23 zeolite that is not yet known in the existing technology but will be known in the future can be used. For example, known methods had been disclosed, for example Rohrman Jr, A. C., et al. "The framework topology of ZSM-23: A high silica zeolite." Zeolites 5.6 (1985): 352-354, U.S. Pat. Nos. 4,076,842, 5,405,596, 5,707,601 and 7,157,075.

In step (3) of the above-mentioned process, preferably, an alkali-treated amorphous silica is used as the silicon source, the silicon source is mixed with an aluminum source, an alkali source (MOH), a template agent (R) and water to form a gel, which is crystallized, filtered, washed, dried and calcined to produce the ZSM-23 zeolite;

More preferably, in the gel, the molar ratio of the silicon source (as $SiO_2$):the aluminum source (as $Al_2O_3$):the alkali source (as hydroxide):the template agent:$H_2O$ is 1:(0.003-0.03):(0.03-0.3):(0.05-2):(10-90); further preferably, in the gel, the molar ratio of the silicon source (as $SiO_2$):the aluminum source (as $Al_2O_3$):the alkali source (as hydroxide):the template agent:$H_2O$ is 1:(0.005-0.02):(0.03-0.16):(0.08-1.6):(20-70); and/or More preferably, the gel is crystallized at 150-200° C., preferably 170-180° C. for 24-96 hours, preferably 36-72 hours, filtered, washed, dried, and calcined to produce the ZSM-23 zeolite; and/or More preferably, the temperature for drying is 80-120° C., the time for drying is 4-12 hours, the temperature for calcining is 500-600° C., the time for calcining is 2-6 hours.

Specifically, the present invention discloses the following technical solutions:

1. A ZSM-23 zeolite, which is characterized in that the pore volume of mesopores having a pore size of 3-8 nm, preferably 3-6 nm of the zeolite is 45-90%, preferably 50-85%, further preferably 55-81% of the total pore volume of the zeolite.

2. The ZSM-23 zeolite according to solution 1, which is characterized in that the zeolite has a relative crystallinity of 95-120%, and the zeolite has a relative crystallinity retention of 95-100% after a hydrothermal treatment with steam for 2 hours at 600° C.

3. The ZSM-23 zeolite according to any of the previous solutions, which is characterized in that the zeolite has a specific surface area of 300-430 $m^2/g$, and a pore volume of 0.31-0.5 $cm^3/g$, the specific surface area of micropores is 50-170 $m^2/g$, and the specific surface area of mesopores is 150-310 $m^2/g$, for example, the zeolite has a specific surface area of 320-405 $m^2/g$, and a pore volume of 0.34-0.45 $cm^3/g$, the specific surface area of micropores is 80-140 $m^2/g$, and the specific surface area of mesopores is 261-295 $m^2/g$.

4. The ZSM-23 zeolite according to any of the previous solutions, which is characterized in that said ZSM-23 zeolite has an XRD pattern comprising the following characteristic peaks expressed by 2θ degree: about 11.3°+/−0.3° (for example +/−0.2° or +/−0.1°).

5. The ZSM-23 zeolite according to any of the previous solutions, which is characterized in that said ZSM-23 zeolite has an XRD pattern comprising the following characteristic peaks expressed by 2θ degree: 11.2-11.5°, 19.5-19.9°, 20.7-21.0°, 22.8-23.1°.

6. A process for preparing the ZSM-23 zeolite according to any of solutions 1-3, wherein the process comprises the following steps:

(1) preparing or selecting a silicon source for preparing the ZSM-23 zeolite, such as amorphous silica;

(2) performing an alkali treatment on the silicon source for preparing the ZSM-23 zeolite mentioned in step (1);

(3) preparing the ZSM-23 zeolite by using the alkali-treated amorphous silica as the silicon source.

7. Use of the alkali-treated amorphous silica obtained in step (2) of the process of solution 4 as the silicon source in the preparation of the ZSM-23 zeolite.

8. The process or use according to any of the previous solutions, which is characterized in that in step (1), said amorphous silica has a specific surface area of 600-1300 $m^2/g$, preferably 700-1200 $m^2/g$; a pore volume of 0.6-1.3 $cm^3/g$, preferably 0.7-1.2 $cm^3/g$; and a pore diameter of 1-13 nm, preferably 2-10 nm.

9. The process or use according to any of the previous solutions, which is characterized in that in step (1), the preparation process of the amorphous silica is as follows: adding a silicon source to deionized water to be uniformly dispersed, and then adding a surfactant and stirring; adjusting the pH of the resulting solution to 1-5, preferably 1.5-4, and then heating it in a water bath for a period of time; filtering, washing, drying, and calcining to produce the amorphous silica.

10. The process or use according to any of the previous solutions, which is characterized in that in step (1), the silicon source is an inorganic silicon source, preferably one or more of water glass, silica sol, or white carbon black.

11. The process or use according to any of the previous solutions, which is characterized in that in step (1), the surfactant is one or more of hexadecyltrimethylammonium chloride, hexadecyltrimethylammonium bromide, octodecyltrimethylammonium chloride, octodecyltrimethylammonium bromide.

12. The process or use according to any of the previous solutions, which is characterized in that in step (1), the molar ratio of said silicon source as $SiO_2$ to the surfactant is 1:(0.02-0.3), preferably 1:(0.05-0.2).

13. The process or use according to any of the previous solutions, which is characterized in that in step (1), the molar ratio of said silicon source as $SiO_2$ to the deionized water is 1:(30-300), preferably 1:(50-220).

14. The process or use according to any of the previous solutions, which is characterized in that in step (1), the temperature for heating is 30-80° C., preferably, 40-70° C., the time for heating is 0.5-8 hours, preferably, 3-6 hours.

15. The process or use according to any of the previous solutions, which is characterized in that in step (1), the temperature for drying is 80-120° C., the time for drying is 4-12 hours, the temperature for calcining is 500-600° C., the time for calcining is 2-6 hours.

16. The process or use according to any of the previous solutions, which is characterized in that in step (2), the alkali treatment involves adding the amorphous silica prepared in step (1) to an alkaline solution, heating and stirring.

17. The process or use according to any of the previous solutions, which is characterized in that in step (2), the alkali treatment is performed by using an inorganic alkali, and the inorganic alkali is one or more of sodium hydroxide, potassium hydroxide, or ammonia water.

18. The process or use according to any of the previous solutions, which is characterized in that in step (2), in the alkali treatment, the time for heating and stirring is 0.5-12 hours, preferably 2-8 hours; and the temperature for heating is 25-60° C., preferably 30-50° C.

19. The process or use according to any of the previous solutions, which is characterized in that in step (2), the molar ratio of the inorganic base as $OH^-$ to the amorphous silica as $SiO_2$ is 0.05-0.24, preferably 0.06-0.22.

20. The process or use according to any of the previous solutions, which is characterized in that in step (3), an alkali-treated amorphous silica is used as the silicon source, the silicon source is mixed with an aluminum source, an alkali source (MOH), a template agent (R) and water to form a gel, which is crystallized, filtered, washed, dried and calcined to produce the ZSM-23 zeolite.

21. The process or use according to any of the previous solutions, which is characterized in that: in the gel, the molar ratio of the silicon source (as $SiO_2$):the aluminum source (as $Al_2O_3$):the alkali source (as hydroxide):the template agent: $H_2O$ is 1:(0.003-0.03):(0.03-0.3):(0.05-2):(10-90); further preferably, in the gel, the molar ratio of the silicon source (as $SiO_2$):the aluminum source (as $Al_2O_3$):the alkali source (as hydroxide):the template agent:$H_2O$ is 1:(0.005-0.02):(0.03-0.16):(0.08-1.6):(20-70).

22. The process or use according to any of the previous solutions, which is characterized in that the gel is crystallized at 150-200° C., preferably 170-180° C. for 24-96 hours, preferably 36-72 hours, filtered, washed, dried, and calcined to produce the ZSM-23 zeolite.

23. The process or use according to any of the previous solutions, which is characterized in that in step (3), the temperature for drying is 80-120° C., the time for drying is 4-12 hours, the temperature for calcining is 500-600° C., the time for calcining is 2-6 hours.

24. an alkali-treated amorphous silica, which is characterized in that: the specific surface area is 600-1300 $m^2/g$, preferably 700-1200 $m^2/g$; the pore volume is 0.6-1.3 $cm^3/g$, preferably 0.7-1.2 $cm^3/g$; the pore diameter is 1-13 nm, preferably 2-10 nm.

25. an alkali-treated amorphous silica, which is characterized in that: the specific surface area is 600-1300 $m^2/g$, preferably 700-1200 $m^2/g$; the pore volume is 0.6-1.3 $cm^3/g$, preferably 0.7-1.2 $cm^3/g$; the pore diameter is 1-13 nm, preferably 2-10 nm;

wherein the alkali treatment is carried out according to step (2) of the process as described in any of solutions 6 and 8-19.

Compared with the prior art, the present invention relates to a ZSM-23 zeolite and a preparation process and use thereof, and has the following advantages:

According to the process of the present invention, a mesoporous amorphous silica is initially prepared with the assistance of the surfactant and used as the silicon source for the later synthesis of the ZSM-23 zeolite. The amorphous silica generated during this process has a mesoporous structure and has not been highly crystallized into a stable crystal form. After a further treatment in a low concentration of the alkaline solution for a period of time, some of the —Si—O— bonds are opened, which facilitates the formation of —Si—O—Al bonds in the zeolite structure; but a majority of the mesoporous structures are retained and generate a microporous structure in a suitable ZSM-23 zeolite synthesis system under the action of the microporous template agent in the later stage. At the same time, the mesoporous structures are further crystallized and stabilized, resulting in the production of a microporous-mesoporous composite ZSM-23 zeolite. The process is a feasible industrial production route due to its easy operational process, the relatively used amounts of the surfactant and the micropore template agent, the relatively low cost, and the excellent product performance of the obtained zeolite.

The ZSM-23 zeolite synthesized by the process of the present invention not only has adjustable acid properties contributive to microporous structure, but also has large pore characteristics contributive to mesoporous structure, high specific surface area and pore volume, as well as high crystallinity, high thermal stability, and high hydrothermal stability. It can be used as an excellent adsorbent or catalyst material and has broader application prospects in the field of shape selective catalysis, further improving its application performance in the petrochemical reactions such as the cracking and isomerization of long-chain alkanes and olefins and the isomerization of aromatics.

DETAILED DESCRIPTION

Figure 1:
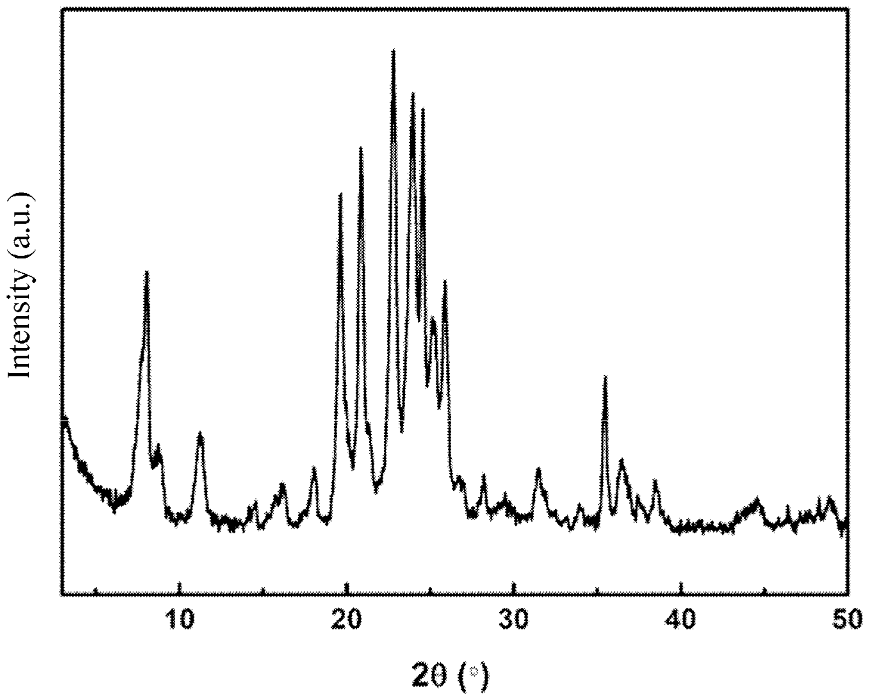
FIG. 1 shows the XRD spectrum of the synthesized product of Example 1 of the present invention.

Analysis Methods According to the Present Invention:

The specific surface area and the pore volume of the zeolite are measured with the ASAP 2405 physical adsorption instrument from Micromeritics Corporation (USA), where the specific surface area refers to the sum of the specific surface area of micropores and the specific surface area of mesopores.

The XRD spectra of the samples are obtained by using the Dmax2500 X-ray diffractometer produced by Rigaku Corporation (Japan), and the relative crystallinity of the sample is obtained by calculation. The relative crystallinity of the zeolite is determined as follows: taking the sum of the heights of diffraction peaks by 2θ degree of approximately 11.3° and 19.5-23° in the XRD spectrum of a conventional ZSM-23 zeolite as 100% crystallinity and comparing with that of other samples to obtain the relative crystallinity.

According to the present invention, the ZSM-23 zeolite has an XRD pattern comprising the following characteristic peaks expressed by 2θ degree: about 11.3°+/−0.3° (for example +/−0.2° or +/−0.1°).

According to the present invention, the ZSM-23 zeolite has an XRD pattern comprising the following characteristic peaks expressed by 2θ degree: 11.2-11.5°, 19.5-19.9°, 20.7-21.0°, and 22.8-23.1°.

In order to better illustrate the present invention, the present invention is further described below in conjunction with Examples and Comparative Examples. But the scope of the present invention is not limited to the scope of these examples.

Example 1

(1) Preparation of Mesoporous Silicon Source

To 250 g of deionized water was added 50 g of water glass (having a $SiO_2$ mass fraction of 27%). The mixture was stirred and dispersed evenly. Then octodecyltrimethylammonium chloride (C18TMACl) was added and the resulting mixture was stirred for 0.5 hours, wherein the molar ratio of $SiO_2$ to C18TMACl was 1:0.08. The solution was adjusted with hydrochloric acid to the pH of 2, and heated in a 50° C. water bath for 4 hours. Then, the reaction system was filtered, washed, dried at 80° C. for 8 hours, and calcined at 550° C. for 3 hours to produce an amorphous silica.

Figure 2:
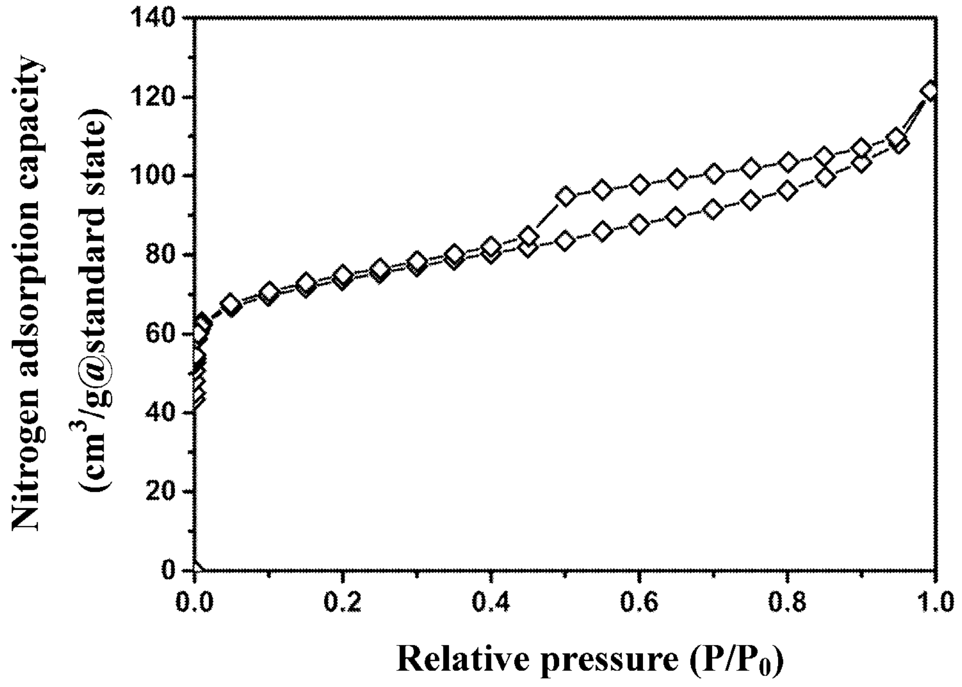
FIG. 2 shows the nitrogen gas physical adsorption diagram of the synthesized product of Example 1 of the present invention.

(2) Preparation of Microporous-Mesoporous ZSM-23 Zeolite a) 0.35 g of NaOH was dissolved in 35 mL of deionized water, 3.7 g of the mesoporous silicon source ($OH^-/SiO_2$ molar ratio=0.14) prepared in step (1) was added, and the mixture was stirred in a 45° C. water bath for 3 hours;

b) aluminum sulfate and isopropylamine (IPA) were successively dissolved in the remaining water, and to the resulting mixture was added the silicon source dispersion obtained from step a) to produce a gel with a total molar ratio of $SiO_2$ in the silicon source:$Al_2O_3$ in the aluminum source:$OH^-$:IPA:$H_2O$=1:0.01:0.08:1.0:50. The resulting gel was crystallized at 180° C. for 48 hours, filtered, washed, dried, and calcined. The resulting product was measured for its relative crystallinity, its specific surface area, its pore volume, and its pore size distribution; and measured for its hydrothermal stability after a hydrothermal treatment with steam for 2 hours at 600° C. Its XRD spectrum was shown in FIG. 1 (confirming that the obtained product is a ZSM-23 zeolite), and the nitrogen gas physical adsorption curve was shown in FIG. 2. The specific properties were shown in Table 1.

Example 2

(1) Preparation of Mesoporous Silicon Source

To 250 g of deionized water was added 50 g of water glass (having a $SiO_2$ mass fraction of 27%). The mixture was stirred and dispersed evenly. Then octodecyltrimethylammonium chloride (C18TMACl) was added and the resulting mixture was stirred for 0.5 hours, wherein the molar ratio of $SiO_2$ to C18TMACl was 1:0.08. The solution was adjusted with hydrochloric acid to the pH of 2, and heated in a 50° C. water bath for 4 hours. Then, the reaction system was filtered, washed, dried at 100° C. for 4 hours, and calcined at 550° C. for 3 hours to produce an amorphous silica.

(2) Preparation of Microporous-Mesoporous ZSM-23 Zeolite a) 0.42 g of NaOH was dissolved in 40 mL of deionized water, 3.7 g of the mesoporous silicon source ($OH^-/SiO_2$ molar ratio=0.17) prepared in step (1) was added, and the mixture was stirred in a 35° C. water bath for 6 hours;

b) aluminum sulfate and isopropylamine (IPA) were successively dissolved in the remaining water, and to the resulting mixture was added the silicon source dispersion obtained from step a) to produce a gel with a total molar ratio of $SiO_2$ in the silicon source:$Al_2O_3$ in the aluminum source:$OH^-$:IPA:$H_2O$=1:0.005:0.10:1.0:50. The resulting gel was crystallized at 180° C. for 48 hours, filtered, washed, dried, and calcined. The resulting product was measured for its relative crystallinity, its specific surface area, its pore volume, and its pore size distribution; and measured for its hydrothermal stability after a hydrothermal treatment with steam for 2 hours at 600° C. Its XRD spectrum was similar to FIG. 1, and the nitrogen gas physical adsorption curve was similar to FIG. 2. The specific properties were shown in Table 1.

Example 3

(1) Preparation of Mesoporous Silicon Source

To 1200 g of deionized water was added 50 g of water glass (having a $SiO_2$ mass fraction of 27%). The mixture was stirred and dispersed evenly. Then octodecyltrimethylammonium chloride (C18TMACl) was added and the resulting mixture was stirred for 2 hours, wherein the molar ratio of $SiO_2$ to C18TMACl was 1:0.2. The solution was adjusted with hydrochloric acid to the pH of 3, and heated in a 50° C. water bath for 4 hours. Then, the reaction system was filtered, washed, dried at 80° C. for 4 hours, and calcined at 500° C. for 3 hours to produce an amorphous silica.

(2) Preparation of Microporous-Mesoporous ZSM-23 Zeolite a) 0.15 g of NaOH was dissolved in 35 mL of deionized water, 3.7 g of the mesoporous silicon source ($OH^-/SiO_2$ molar ratio=0.06) prepared in step (1) was added, and the mixture was stirred in a 45° C. water bath for 3 hours;

b) aluminum sulfate, isopropylamine (IPA) and NaOH were successively dissolved in the remaining water, and to the resulting mixture was added the silicon source dispersion obtained from step a) to produce a gel with a total molar ratio of $SiO_2$ in the silicon source:$Al_2O_3$ in the aluminum source:$OH^-$:IPA:$H_2O$=1:0.01:0.08:1.0:50. The resulting gel was crystallized at 180° C. for 48 hours, filtered, washed, dried, and calcined. The resulting product was measured for its relative crystallinity, its specific surface area, its pore volume, and its pore size distribution; and measured for its hydrothermal stability after a hydrothermal treatment with steam for 2 hours at 600° C. Its XRD spectrum was similar to FIG. 1, and the nitrogen gas physical adsorption curve was similar to FIG. 2. The specific properties were shown in Table 1.

Example 4

(1) Preparation of Mesoporous Silicon Source

To 800 g of deionized water was added 50 g of water glass (having a $SiO_2$ mass fraction of 27%). The mixture was stirred and dispersed evenly. Then octodecyltrimethylammonium chloride (C18TMACl) was added and the resulting mixture was stirred for 2 hours, wherein the molar ratio of $SiO_2$ to C18TMACl was 1:0.15. The solution was adjusted with hydrochloric acid to the pH of 4, and heated in a 50° C. water bath for 4 hours. Then, the reaction system was filtered, washed, dried at 90° C. for 4 hours, and calcined at 550° C. for 3 hours to produce an amorphous silica.

(2) Preparation of Microporous-Mesoporous ZSM-23 Zeolite a) 0.42 g of NaOH was dissolved in 40 mL of deionized water, 3.7 g of the mesoporous silicon source ($OH^-/SiO_2$ molar ratio=0.17) prepared in step (1) was added, and the mixture was stirred in a 40° C. water bath for 3 hours;

b) aluminum sulfate and isopropylamine (IPA) were successively dissolved in the remaining water, and to the resulting mixture was added the silicon source dispersion obtained from step a) to produce a gel with a total molar ratio of $SiO_2$ in the silicon source:$Al_2O_3$ in the aluminum source:$OH^-$:IPA:$H_2O$=1:0.005:0.10:1.0:50. The resulting gel was crystallized at 180° C. for 48 hours, filtered, washed, dried, and calcined. The resulting product was measured for its relative crystallinity, its specific surface area, its pore volume, and its pore size distribution; and measured for its hydrothermal stability after a hydrothermal treatment with steam for 2 hours at 600° C. Its XRD spectrum was similar to FIG. 1, and the nitrogen gas physical adsorption curve was similar to FIG. 2. The specific properties were shown in Table 1.

Example 5

(1) Preparation of Mesoporous Silicon Source

To 210 g of deionized water was added 50 g of water glass (having a $SiO_2$ mass fraction of 27%). The mixture was stirred and dispersed evenly. Then octodecyltrimethylammonium chloride (C18TMACl) was added and the resulting mixture was stirred for 1 hour, wherein the molar ratio of $SiO_2$ to C18TMACl was 1:0.05. The solution was adjusted with hydrochloric acid to the pH of 2, and heated in a 60° C. water bath for 4 hours. Then, the reaction system was filtered, washed, dried at 80° C. for 8 hours, and calcined at 550° C. for 3 hours to produce an amorphous silica.

(2) Preparation of Microporous-Mesoporous ZSM-23 Zeolite a) 0.35 g of NaOH was dissolved in 35 mL of deionized water, 3.7 g of the mesoporous silicon source ($OH^-/SiO_2$ molar ratio=0.14) prepared in step (1) was added, and the mixture was stirred in a 50° C. water bath for 2 hours;

b) aluminum sulfate and isopropylamine (IPA) were successively dissolved in the remaining water, and to the resulting mixture was added the silicon source dispersion obtained from step a) to produce a gel with a total molar ratio of $SiO_2$ in the silicon source:$Al_2O_3$ in the aluminum source:$OH^-$:IPA:$H_2O$=1:0.01:0.08:1.0:50. The resulting gel was crystallized at 180° C. for 48 hours, filtered, washed, dried, and calcined. The resulting product was measured for its relative crystallinity, its specific surface area, its pore volume, and its pore size distribution; and measured for its hydrothermal stability after a hydrothermal treatment with steam for 2 hours at 600° C. Its XRD spectrum was similar to FIG. 1, and the nitrogen gas physical adsorption curve was similar to FIG. 2. The specific properties were shown in Table 1.

Example 6

(1) Preparation of Mesoporous Silicon Source

To 210 g of deionized water was added 50 g of water glass (having a $SiO_2$ mass fraction of 27%). The mixture was stirred and dispersed evenly. Then octodecyltrimethylammonium chloride (C18TMACl) was added and the resulting mixture was stirred for 1 hour, wherein the molar ratio of $SiO_2$ to C18TMACl was 1:0.06. The solution was adjusted with hydrochloric acid to the pH of 2, and heated in a 60° C. water bath for 4 hours. Then, the reaction system was filtered, washed, dried at 80° C. for 8 hours, and calcined at 550° C. for 3 hours to produce an amorphous silica.

(2) Preparation of Microporous-Mesoporous ZSM-23 Zeolite a) 0.10 g of NaOH and 1.36 g of concentrated ammonia water (having a mass fraction of about 27%) was dissolved in 35 mL of deionized water, 3.7 g of the mesoporous silicon source ($OH^-/SiO_2$ molar ratio=0.22) prepared in step (1) was added, and the mixture was stirred in a 40° C. water bath for 6 hours;

b) aluminum sulfate and isopropylamine (IPA) were successively dissolved in the remaining water, and to the resulting mixture was added the silicon source dispersion obtained from step a) to produce a gel with a total molar ratio of $SiO_2$ in the silicon source:$Al_2O_3$ in the aluminum source:$OH^-$:IPA:$H_2O$=1:0.01:0.15:1.0:50. The resulting gel was crystallized at 180° C. for 48 hours, filtered, washed, dried, and calcined. The resulting product was measured for its relative crystallinity, its specific surface area, its pore volume, and its pore size distribution; and measured for its hydrothermal stability after a hydrothermal treatment with steam for 2 hours at 600° C. Its XRD spectrum was similar to FIG. 1, and the nitrogen gas physical adsorption curve was similar to FIG. 2. The specific properties were shown in Table 1.

Comparative Example 1 (According to CN105540607A)

0.51 g of pseudo-boehmite and 0.3 g of sodium hydroxide were added to 26 mL of deionized water under stirring at 35° C. The resulting solution was homogenized, then 0.3 g of isopropylamine was added, then 21 g of white carbon black was added, and the resulting mixture was homogenized and mixed for 1 hour. 24.5 g of cereal starch was added, and the resulting mixture was heated to 90° C., stirred and aged for 6 hours. Finally, the resulting mixture was transferred to a hydrothermal reaction vessel lined with PTFE, statically crystallized at 160° C. for 144 hours, taken out, cooled, filtered, and dried at 80° C. to obtain the raw powder of zeolite. The raw powder was calcined at 500° C. for 12 hours under an air atmosphere to produce a micropore-mesopore composite ZSM-23 zeolite, which was measured for its relative crystallinity, its specific surface area, its pore volume and its pore size distribution, and measured for its hydrothermal stability after a hydrothermal treatment with steam for 2 hours at 600° C. The specific properties were shown in Table 1.

Comparative Example 2

(1) Preparation of Mesoporous Silicon Source

To 250 g of deionized water was added 50 g of water glass (having a $SiO_2$ mass fraction of 27%). The mixture was stirred and dispersed evenly. Then octodecyltrimethylammonium chloride (C18TMACl) was added and the resulting mixture was stirred for 0.5 hours, wherein the molar ratio of $SiO_2$ to C18TMACl was 1:0.08. The solution was adjusted with hydrochloric acid to the pH of 2, and heated in a 50° C. water bath for 4 hours. Then, the reaction system was filtered, washed, dried, and calcined at 550° C. to produce an amorphous silica.

(2) a) 3.7 g of the mesoporous silicon source prepared in step (1) was dispersed in 35 mL of deionized water, and the mixture was stirred in a 50° C. water bath for 2 hours;

b) aluminum sulfate, isopropylamine (IPA) and NaOH were successively dissolved in the remaining water, and to the resulting mixture was added the silicon source dispersion obtained from step a) to produce a gel with a total molar ratio of $SiO_2$ in the silicon source:$Al_2O_3$ in the aluminum source: NaOH:IPA:$H_2O$=1:0.01:0.08:1.0:50. The resulting gel was crystallized at 180° C. for 48 hours, filtered, washed, dried, and calcined. The resulting product was measured for its relative crystallinity, its specific surface area, its pore volume, and its pore size distribution; and measured for its hydrothermal stability after a hydrothermal treatment with steam for 2 hours at 600° C. The specific properties were shown in Table 1.

Comparative Example 3

(1) Preparation of Mesoporous Silicon Source

To 1200 g of deionized water was added 50 g of water glass (having a $SiO_2$ mass fraction of 27%). The mixture was stirred and dispersed evenly. Then octodecyltrimethylammonium chloride (C18TMACl) was added and the resulting mixture was stirred for 2 hours, wherein the molar ratio of $SiO_2$ to C18TMACl was 1:0.2. The solution was adjusted with hydrochloric acid to the pH of 3, and heated in a 50° C. water bath for 4 hours. Then, the reaction system was filtered, washed, dried, and calcined at 550° C. to produce an amorphous silica.

(2) a) 0.70 g of NaOH was dissolved in 40 mL of deionized water, 3.7 g of the mesoporous silicon source ($OH^-/SiO_2$ molar ratio=0.28) prepared in step (1) was added, and the mixture was stirred in a 45° C. water bath for 3 hours;

b) aluminum sulfate and isopropylamine (IPA) were successively dissolved in the remaining water, and to the resulting mixture was added the silicon source dispersion obtained from step a) to produce a gel with a total molar ratio of $SiO_2$ in the silicon source:$Al_2O_3$ in the aluminum source: NaOH:IPA:$H_2O$=1:0.01:0.16:1.0:50. The resulting gel was crystallized at 180° C. for 48 hours, filtered, washed, dried, and calcined. The resulting product was measured for its relative crystallinity, its specific surface area, its pore volume, and its pore size distribution; and measured for its hydrothermal stability after a hydrothermal treatment with steam for 2 hours at 600° C.

Comparative Example 4

(1) Preparation of Mesoporous Silicon Source

To 1200 g of deionized water was added 50 g of water glass (having a $SiO_2$ mass fraction of 27%). The mixture was stirred and dispersed evenly. Then octodecyltrimethylammonium chloride (C18TMACl) was added and the resulting mixture was stirred for 2 hours, wherein the molar ratio of $SiO_2$ to C18TMACl was 1:0.2. The solution was adjusted with hydrochloric acid to the pH of 3, and heated in a 50° C. water bath for 4 hours. Then, the reaction system was filtered, washed, dried, and calcined at 550° C. to produce an amorphous silica.

(2) a) 0.10 g of NaOH was dissolved in 40 mL of deionized water, 3.7 g of the mesoporous silicon source ($OH^-/SiO_2$ molar ratio=0.04) prepared in step (1) was added, and the mixture was stirred in a 45° C. water bath for 3 hours;

b) aluminum sulfate, isopropylamine (IPA) and sodium hydroxide were successively dissolved in the remaining water, and to the resulting mixture was added the silicon source dispersion obtained from step a) to produce a gel with a total molar ratio of $SiO_2$ in the silicon source:$Al_2O_3$ in the aluminum source:NaOH:IPA:$H_2O$=1:0.01:0.08:1.0:50. The resulting gel was crystallized at 180° C. for 48 hours, filtered, washed, dried, and calcined. The resulting product was measured for its relative crystallinity, its specific surface area, its pore volume, and its pore size distribution; and measured for its hydrothermal stability after a hydrothermal treatment with steam for 2 hours at 600° C.

Comparative Example 5 (Preparation of the Conventional ZSM-23 Zeolite)

Water glass, aluminum sulfate, isopropylamine (IPA), sodium hydroxide and water were mixed to produce a gel with a total molar ratio of $SiO_2$ in the silicon source:$Al_2O_3$ in the aluminum source:NaOH:IPA:$H_2O$=1:0.01:0.08:1.0:50. The resulting gel was heated at 180° C. for 72 hours, filtered, washed, dried, and calcined. The resulting product was measured for its relative crystallinity; and measured for its hydrothermal stability after a hydrothermal treatment with steam for 2 hours at 600° C. The specific properties were shown in Table 1.

TABLE 1

| | Specific surface area, $m^2/g$ | Microporous surface area, $m^2/g$ | Microporous surface area, $m^2/g$ | Pore volume, $cm^3/g$ | Content of mesopores with pore size of 3-8 nm | Relative crystallinity, % | Relative crystallinity after hydrothermal treatment, % | Relative crystallinity retention, %[d] |
|---|---|---|---|---|---|---|---|---|
| Example 1 | 395 | 105 | 290 | 0.42 | 77 | 102 | 103 | 100 |
| Example 2 | 387 | 99 | 288 | 0.41 | 56 | 104 | 102 | 98 |
| Example 3 | 398 | 107 | 291 | 0.45 | 80 | 114 | 110 | 96 |
| Example 4 | 378 | 101 | 277 | 0.38 | 60 | 100 | 99 | 99 |
| Example 5 | 384 | 91 | 293 | 0.40 | 69 | 113 | 108 | 96 |
| Example 6 | 401 | 114 | 287 | 0.45 | 84 | 105 | 106 | 100 |
| Comparative Example 1 | 289 | 126 | 163 | 0.28 | 31 | 103 | 74 | 72 |
| Comparative Example 2 | 69 | 61 | 8 | 0.03 | —[a] | —[a] | —[a] | —[a] |
| Comparative Example 3 | 232 | 167 | 65 | 0.24 | —[b] | —[b] | —[b] | —[b] |

TABLE 1-continued

| | Specific surface area, $m^2/g$ | Microporous surface area, $m^2/g$ | Microporous surface area, $m^2/g$ | Pore volume, $cm^3/g$ | Content of mesopores with pore size of 3-8 nm | Relative crystallinity, % | Relative crystallinity after hydrothermal treatment, % | Relative crystallinity retention, %[d] |
|---|---|---|---|---|---|---|---|---|
| Comparative Example 4 | 108 | 84 | 24 | 0.09 | —[c] | —[c] | —[c] | —[c] |
| Comparative Example 5 | 228 | 188 | 40 | 0.24 | 18 | 100 | 101 | 100 |

[a]Under this condition, the zeolite product was not produced through crystallization, so this property could not be analyzed.
[b]Under this condition, the obtained products are mainly other zeolites, so this property could not be analyzed.
[c]Under this condition, the crystallization was incompleted, so this property could not be analyzed.
[d]Relative crystallinity retention = crystallinity after hydrothermal treatment/relative crystallinity. Due to measurement errors, results greater than 100% were recorded as 100%.

It can be seen from the data in Table 1 that the preparation processes in the examples of the present invention could prepare ZSM-23 zeolites with micropore-mesopore composite structures through a simple synthesis process with a relatively small amount of surfactant at a relatively low cost. The obtained product, a micropore-mesopore composite ZSM-23 zeolite, has high crystallinity, large specific surface area and pore volume, high mesopore content, relatively concentrated size distribution, good thermal stability and hydrothermal stability, and broad application prospects. The performance of ZSM-23 zeolite samples was evaluated on a fixed bed micro reactor. The reaction conditions and catalytic results of Comparative Example 1, Comparative Example 5, Example 4 and Example 6 in the linear $C_{20}$-$C_{30}$ hydroisomerization reaction were as follows: Reaction raw materials: 90 wt % decahydronaphthalene, 10 wt % $C_{20}$-$C_{30}$ straight chain alkanes; Reaction conditions: reaction temperature 280° C.; Liquid hourly space velocity 1.0 $h^{-1}$; Hydrogen to oil ratio 600; Reaction hydrogen pressure 4.0 MPa;

Comparative Example 1

Liquid yield ($C_5^+$): 93%; $C_{20}$-$C_{30}$ Isomerization degree: 100%; $C_{20}$-$C_{30}$ isomerization product yield: 46%; Ratio of multiple-branched chain components to single-branched chain components in $C_{20}$-$C_{30}$ isomerization product: 0.6.

Comparative Example 5

Liquid yield ($C_5^+$): 94%; $C_{20}$-$C_{30}$ Isomerization degree: 100%; $C_{20}$-$C_{30}$ isomerization product yield: 44%; Ratio of multiple-branched chain components to single-branched chain components in $C_{20}$-$C_{30}$ isomerization product: 0.5.

Example 4

Liquid yield ($C_5^+$): 95%; $C_{20}$-$C_{30}$ Isomerization degree: 100%; $C_{20}$-$C_{30}$ isomerization product yield: 53%; Ratio of multiple-branched chain components to single-branched chain components in $C_{20}$-$C_{30}$ isomerization product: 2.1.

Example 6

Liquid yield ($C_5^+$): 96%; $C_{20}$-$C_{30}$ Isomerization degree: 100%; $C_{20}$-$C_{30}$ isomerization product yield: 54%; Ratio of multiple-branched chain components to single-branched chain components in $C_{20}$-$C_{30}$ isomerization product: 2.3.

The invention claimed is:

1. A ZSM-23 zeolite, wherein the pore volume of mesopores having a pore size of 3-8 nm of the zeolite is 45-90% of the total pore volume of the zeolite.

2. The ZSM-23 zeolite according to claim 1, wherein the pore volume of mesopores having a pore size of 3-6 nm of the zeolite is 55-81% of the total pore volume of the zeolite.

3. The ZSM-23 zeolite according to claim 1, wherein the zeolite has a relative crystallinity of 95-120%, and the zeolite has a relative crystallinity retention of 95-100% after a hydrothermal treatment with steam for 2 hours at 600° C.

4. The ZSM-23 zeolite according to claim 1, wherein the zeolite has a specific surface area of 300-430 $m^2/g$, and a pore volume of 0.31-0.5 $cm^3/g$, the specific surface area of micropores is 50-170 $m^2/g$, and the specific surface area of mesopores is 150-310 $m^2/g$.

5. A process for preparing the ZSM-23 zeolite according to claim 1, wherein the process comprises the following steps:

(1) preparing or selecting an amorphous silica;

(2) performing an alkali treatment on the amorphous silica; and (3) preparing the ZSM-23 zeolite by using the alkali-treated amorphous silica.

6. The process according to claim 5, wherein, in step (1), the amorphous silica has a specific surface area of 600-1300 $m^2/g$; a pore volume of 0.6-1.3 $cm^3/g$; and a pore diameter of 1-13 nm.

7. The process according to claim 5, wherein step (1) comprises:

adding a silicon source to deionized water to be uniformly dispersed, and then adding a surfactant and stirring; adjusting the pH of the resulting solution to 1-5, and then heating it in a water bath for a period of time; filtering, washing, drying, and calcining to produce the amorphous silica.

8. The process according to claim 7, which is characterized in that in step (1), the silicon source is one or more selected from water glass, silica sol, and white carbon black.

9. The process according to claim 7, wherein, in step (1), the surfactant is one or more selected from hexadecyltrimethylammonium chloride, hexadecyltrimethylammonium bromide, octodecyltrimethylammonium chloride, and octodecyltrimethylammonium bromide.

10. The process according to claim 7, wherein, in step (1), the molar ratio of the silicon source as $SiO_2$ to the surfactant is 1:(0.02-0.3).

11. The process according to claim 7, wherein, in step (1), the molar ratio of the silicon source as $SiO_2$ to the deionized water is 1:(30-300).

12. The process according to claim 7, wherein, in step (1), the heating is carried out at 30-80° C. for heating is for 0.5-8 hours.

13. The process according to claim 7, wherein, in step (1), the drying is carried out at 80-120° C. for 4-12 hours, and the calcining is carried out at 500-600° C. for 2-6 hours.

14. The process according to claim 5, wherein, in step (2), the alkali treatment comprises adding the amorphous silica to an alkaline solution, heating and stirring the mixture thereof.

15. The process according to claim 14, wherein, in step (2), the alkaline solution comprises an inorganic alkali selected from one or more of sodium hydroxide, potassium hydroxide, and ammonia water.

16. The process according to claim 14, wherein, in step (2), in the alkali treatment, the heating and stirring is carried out for 0.5-12 hours at 25-60° C.

17. The process according to claim 5, wherein, in step (2), the molar ratio of the inorganic alkali as $OH^-$ to the amorphous silica as $SiO_2$ is 0.05-0.24.

18. The process according to claim 5, wherein step (3) comprising mixing the alkali-treated amorphous silica with an aluminum source, an alkali source (MOH), a template agent and water to form a gel, crystalizing, filtering, washing, drying, and calcining the gel to produce the ZSM-23 zeolite.

19. The process according to claim 18, wherein, in the gel, the molar ratio of the alkali-treated amorphous silica silicon (as $SiO_2$):the aluminum source (as $Al_2O_3$):the alkali source (as hydroxide):the template agent:$H_2O$ is 1:(0.003-0.03):(0.03-0.3):(0.05-2):(10-90).

20. The process according to claim 18, wherein the gel is crystallized at 150-200° C. for 24-96 hours, filtered, washed, dried, and calcined to produce the ZSM-23 zeolite.

21. The process according to claim 18, wherein, in step (3), the drying is carried out at 80-120° C. for 4-12 hours, and the calcining is carried out 500-600° C. for calcining is 2-6 hours.

* * * * *